US012687629B2

(12) United States Patent
Tapia et al.

(10) Patent No.: US 12,687,629 B2
(45) Date of Patent: Jul. 21, 2026

(54) USE OF CAMERA INFORMATION FOR RADAR BEAMFORMING

(71) Applicant: GM CRUISE HOLDINGS LLC, San Francisco, CA (US)

(72) Inventors: Daniel Flores Tapia, Fairfield, CA (US); Jace Artichoker, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 967 days.

(21) Appl. No.: 17/729,198

(22) Filed: Apr. 26, 2022

(65) Prior Publication Data

US 2023/0341542 A1     Oct. 26, 2023

(51) Int. Cl.
| | |
|---|---|
| *G01S 13/86* | (2006.01) |
| *G01C 11/02* | (2006.01) |
| *G01S 13/931* | (2020.01) |
| *G06T 7/73* | (2017.01) |

(52) U.S. Cl.
CPC ............ *G01S 13/867* (2013.01); *G01C 11/02* (2013.01); *G01S 13/931* (2013.01); *G06T 7/73* (2017.01); *G01S 2013/9322* (2020.01)

(58) Field of Classification Search
CPC ...... G01S 13/867; G01S 13/931; G01S 13/87; G01S 13/89; G01S 7/2955; G01C 11/02
See application file for complete search history.

(56) References Cited

U.S. PATENT DOCUMENTS

| | | | | |
|---|---|---|---|---|
| 2017/0200273 A1* | 7/2017 | Kamilov | ................. | G01S 17/86 |
| 2021/0156990 A1* | 5/2021 | Madhow | ................. | G01S 13/42 |
| 2021/0255304 A1* | 8/2021 | Fontijne | ................ | G01S 13/931 |
| 2022/0066456 A1* | 3/2022 | Ebrahimi Afrouzi | ...................... | |
| | | | | G06F 3/04883 |
| 2023/0417896 A1* | 12/2023 | Muller | .................. | G01S 13/426 |

FOREIGN PATENT DOCUMENTS

| | | |
|---|---|---|
| EP | 4270048 | 11/2023 |
| JP | 5376854 | 12/2013 |

OTHER PUBLICATIONS

Radartutorial.eu (https://web.archive.org/web/20210507115844/https://www.radartutorial.eu/01.basics/Radar%20Cross%20Section.en.html) (Year: 2021).*

(Continued)

*Primary Examiner* — Ig T An
(74) *Attorney, Agent, or Firm* — CANTOR COLBURN LLP

(57) ABSTRACT

Use of camera information for radio detection and ranging (RADAR) beamforming is disclosed. Camera information for a scene having a target object is received. Digital RADAR waveforms corresponding to a frame of reference including the at target object are received. Coordinates for the scene in the camera frame of reference are translated to the RADAR frame of reference. A radar cross section estimation is determined for the object based on the transformed coordinates. A kernel is selected based on the radar cross section estimation. RADAR signal processing is performed on the digital RADAR waveforms utilizing the selected kernel. A point cloud is populated based on results from the RADAR signal processing.

17 Claims, 5 Drawing Sheets

(56)  References Cited

OTHER PUBLICATIONS

Extended European Search Report and Written Opinion issued from the European Patent Office for EP Application No. 213166783.3-1206, mailing date Oct. 2, 2023, 12 pages.

Bilik Igal et al: "The Rise of Radar for Autonomous Vehicles: Signal processing solutions and future research directions", IEEE Signal Processing Magazine, IEEE, USA, vol. 36, No. 5, Sep. 1, 2019 (Sep. 1, 2019), pp. 20-31.

Han Heejae et al:"Object classificationon raw radar data using convolutional neural networks", 2019 IEEE Sensors Applications Symposium (SAS), IEEE, Mar. 11, 2019 (Mar. 11, 2019), pp. 1-6.

* cited by examiner

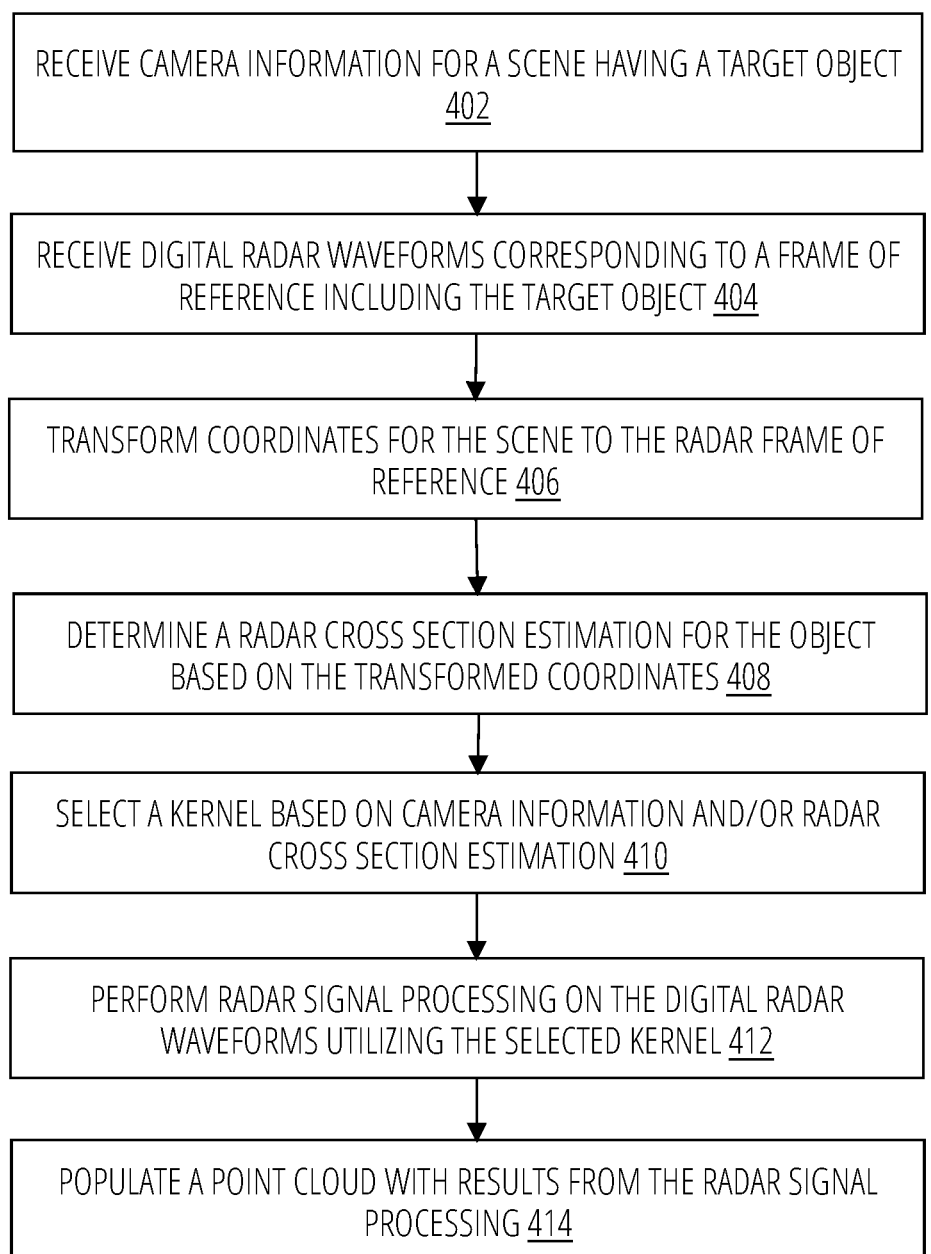

RECEIVE CAMERA INFORMATION FOR A SCENE HAVING A TARGET OBJECT
402

RECEIVE DIGITAL RADAR WAVEFORMS CORRESPONDING TO A FRAME OF
REFERENCE INCLUDING THE TARGET OBJECT 404

TRANSFORM COORDINATES FOR THE SCENE TO THE RADAR FRAME OF
REFERENCE 406

DETERMINE A RADAR CROSS SECTION ESTIMATION FOR THE OBJECT
BASED ON THE TRANSFORMED COORDINATES 408

SELECT A KERNEL BASED ON CAMERA INFORMATION AND/OR RADAR
CROSS SECTION ESTIMATION 410

PERFORM RADAR SIGNAL PROCESSING ON THE DIGITAL RADAR
WAVEFORMS UTILIZING THE SELECTED KERNEL 412

POPULATE A POINT CLOUD WITH RESULTS FROM THE RADAR SIGNAL
PROCESSING 414

FIG. 4

PROCESSOR(S) <u>516</u>

INSTRUCTIONS TO RECEIVE CAMERA INFORMATION FOR A SCENE HAVING A TARGET OBJECT <u>502</u>

INSTRUCTIONS TO RECEIVE DIGITAL RADAR WAVEFORMS CORRESPONDING TO A FRAME OF REFERENCE INCLUDING THE TARGET OBJECT <u>504</u>

INSTRUCTIONS TO TRANSFORM COORDINATES FOR THE SCENE TO THE RADAR FRAME OF REFERENCE <u>506</u>

INSTRUCTIONS TO DETERMINE A RADAR CROSS SECTION ESTIMATION FOR THE OBJECT BASED ON THE TRANSFORMED COORDINATES <u>508</u>

INSTRUCTIONS TO SELECT A KERNEL BASED ON CAMERA INFORMATION AND/OR RADAR CROSS SECTION ESTIMATION <u>510</u>

INSTRUCTIONS TO POPULATE A POINT CLOUD WITH RESULTS FROM THE RADAR SIGNAL PROCESSING <u>512</u>

NON-TRANSITORY COMPUTER READABLE STORAGE MEDIUM <u>518</u>

SYSTEM <u>514</u>

FIG. 5

USE OF CAMERA INFORMATION FOR RADAR BEAMFORMING

TECHNICAL FIELD

Examples provided herein relate to beamforming for automotive radio detection and ranging (RADAR) sensor systems. More particularly, examples provided herein relate to use of camera data to augment RADAR system beamforming.

BACKGROUND

Autonomous vehicles, also known as self-driving cars, driverless vehicles, and robotic vehicles, may be vehicles that use multiple sensors to sense the environment and move without human input. The sensors (and sensor systems) can include cameras and/or RADAR systems to provide information about the autonomous vehicle operating environment to control systems of the autonomous vehicle. Automation technology in the autonomous vehicles may enable the vehicles to drive on roadways and to accurately and quickly perceive the vehicle's environment, including obstacles, signs, and traffic lights. Autonomous technology may utilize map data that can include geographical information and semantic objects (such as parking spots, lane boundaries, intersections, crosswalks, stop signs, traffic lights) for facilitating driving safety. The autonomous vehicles can be used to pick up passengers and drive the passengers to selected destinations. The autonomous vehicles can also be used to pick up packages and/or other goods and deliver the packages and/or goods to selected destinations.

BRIEF DESCRIPTION OF THE DRAWINGS

To easily identify the discussion of any particular element or act, the most significant digit or digits in a reference number refer to the figure number in which that element is first introduced.

FIG. 4 is a flow diagram for one technique for utilizing camera information for RADAR beamforming.

FIG. 5 is a block diagram of one example of a processing system that can utilize camera information for RADAR beamforming.

DETAILED DESCRIPTION

Figure 1:
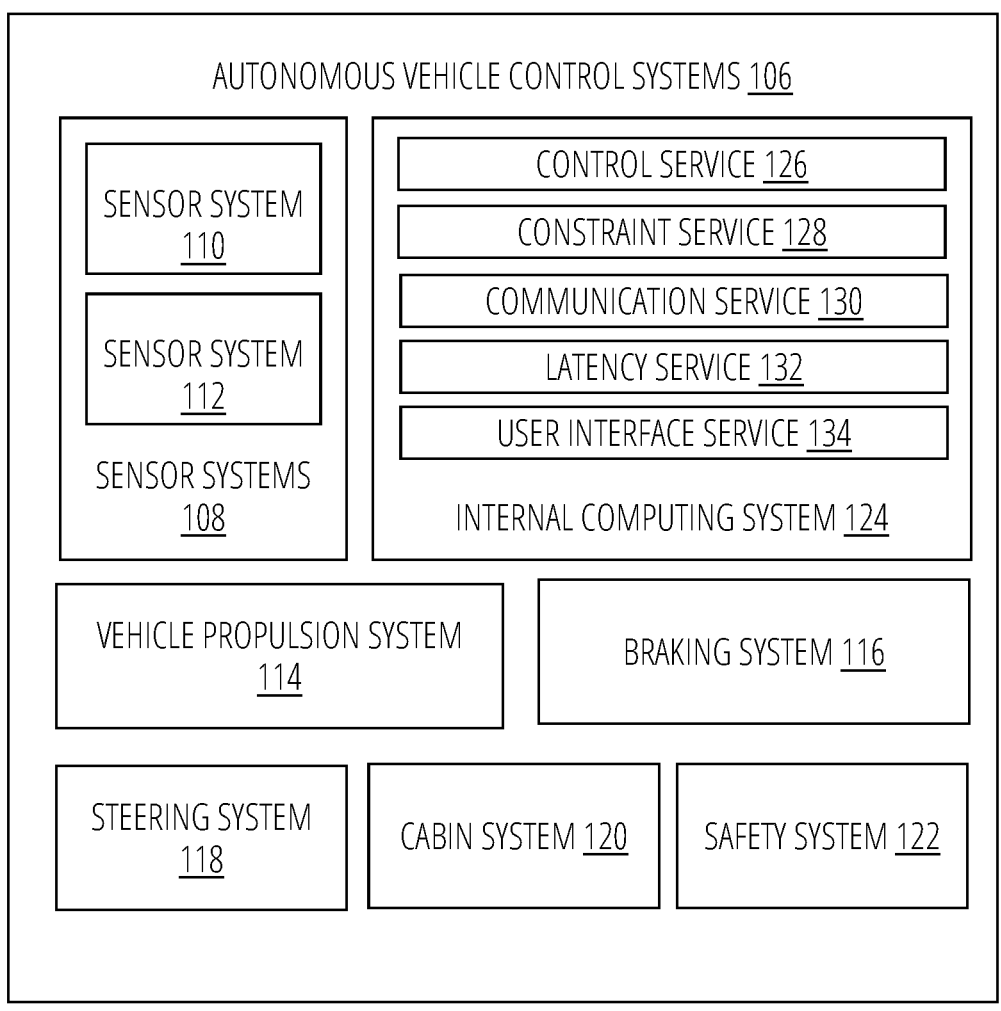
FIG. 1 is a block diagram of an example autonomous vehicle.
Figure 1:
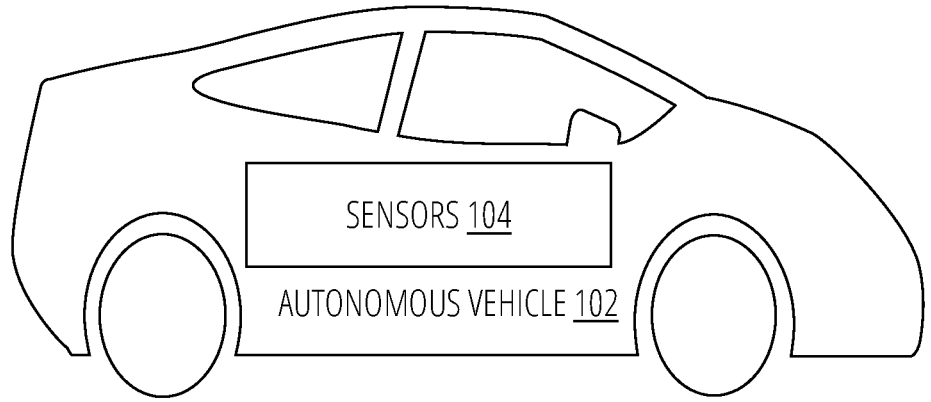

One current technique for generating point cloud information is Maximum Likelihood Estimation (MLE) or similar techniques. Maximum Likelihood Estimation is a technique for estimating the parameters of an assumed probability distribution based on observed data. As a simple example, if a set of data is known to follow a normal distribution but the mean and variance are unknown, Maximum Likelihood Estimation can be used to estimate the mean and variance based on a limited sample by finding particular values of the mean and variance so that the observed data is the most likely result to have occurred. Maximum Likelihood Estimation is used in various settings including, for example, econometrics, satellite imaging, etc.

Use of Maximum Likelihood Estimation with automotive RADAR for point cloud formation involves challenges when increasing the spatial resolution of the beamforming (point cloud generation) stage. A generic kernel (to extract target signatures) can be used; however, use of a generic kernel can provide lower resolution than if a kernel collection (having multiple kernels available to be selected) is used. A kernel is a time series representation of a given target. The time series representation of the kernel is used as the fundamental element in correlation operations performed in the approaches described herein.

As described in various examples below, use of a kernel collection allows selection of the most suitable kernel based on potentially dynamically changing information. When using previous approaches, the use of kernel collections results in an increase of sensor latency.

In the examples below, processing chains are described that take advantage of segmented target on a visible and/or infrared camera image cloud that can be co-registered with a RADAR sensor system field of view (FoV), which can provide information to select a kernel for processing of the received RADAR echoes. In an example, camera images from a scan region can be segmented and a set of initial target labels can be generated. The received RADAR echoes from the scan region are processed by the front end of the RADAR sensor system and converted to digital values.

The camera label information and digital RADAR signals can be sent to the RADAR signal processor where the target cross section range is estimated and an appropriate kernel can be selected based on, for example, location and target type for one or more targets identified using at least the camera information. In an example, the best kernel for each target in a scene is selected using, for example, location and target type. Beamforming is performed by, for example, convolving the RADAR data with the selected kernel for each target. The approach as outlined can make use of the target locations to maximize output resolution in the regions of the targets. A point cloud can then be populated. A point cloud is a set of data points in space that can represent objects or shapes in three dimensions, where each object can have corresponding Cartesian coordinates (X, Y, Z).

FIG. 1 is a block diagram of an example autonomous vehicle. Autonomous vehicle 102 has the functionality to navigate roads without a human driver by utilizing sensors 104 and autonomous vehicle control systems 106.

Autonomous vehicle 102 can include, for example, sensor systems 108 including any number of sensor systems (e.g., sensor system 110, sensor system 112). Sensor systems 108 can include various types of sensors that can be arranged throughout autonomous vehicle 102. For example, sensor system 110 can be a camera sensor system (image and/or infrared). As another example, sensor system 112 can be a light detection and ranging (LIDAR) sensor system. As a further example, one of sensor systems 108 can be a radio detection and ranging (RADAR) sensor system, an electromagnetic detection and ranging (EmDAR) sensor system, a sound navigation and ranging (SONAR) sensor system, a sound detection and ranging (SODAR) sensor system, a global navigation satellite system (GNSS) receiver system, a global positioning system (GPS) receiver system, accelerometers, gyroscopes, inertial measurement unit (IMU) systems, infrared sensor systems, laser rangefinder systems, microphones, etc.

Using the various examples described herein, the spatial resolution of the RADAR sensors of autonomous vehicle 102 can be significantly increased by using information extracted from camera sensors. The camera sensor information can be, for example, visible and/or infrared information. Various techniques for utilizing camera sensor information are described below and can include, for example, heuristic information related to object size and/or distance, etc.

In some examples described herein autonomous vehicle 102 (or another device) may be described as collecting data corresponding to surrounding vehicles. This data may be collected without associated identifiable information from these surrounding vehicles (e.g., without license plate numbers, make, model, the color of the surrounding vehicles, driver image information). Accordingly, the techniques mentioned here can because for the beneficial purposes described, but without the need to store potentially sensitive information of the surrounding vehicles.

Autonomous vehicle 102 can further include mechanical systems to control and manage motion of autonomous vehicle 102. For example, the mechanical systems can include vehicle propulsion system 114, braking system 116, steering system 118, cabin system 120 and safety system 122. Vehicle propulsion system 114 can include, for example, an electric motor, an internal combustion engine, or both. Braking system 116 can include an engine brake, brake pads, actuators and/or other components to control deceleration of autonomous vehicle 102. Steering system 118 can include components that control the direction of autonomous vehicle 102. Cabin system 120 can include, for example, cabin temperature control systems, in-cabin infotainment systems and other internal elements.

Safety system 122 can include various lights, signal indicators, airbags, systems that detect and react to other vehicles. Safety system 122 can include one or more radar systems. Autonomous vehicle 102 can utilize different types of radar systems, for example, long-range radar (LRR), mid-range radar (MRR) and/or short-range radar (SRR). LRR systems can be used, for example, to detect objects that are farther away (e.g., 200 meters, 300 meters) from the vehicle transmitting the signal. LRR systems can operate in the 77 GHz band (e.g., 76-81 GHz). SRR systems can be used, for example, for blind spot detection or collision avoidance. SRR systems can operate in the 24 GHz band. MRR systems can operate in either the 24 GHZ band or the 77 GHz band. Other frequency bands can also be supported.

Autonomous vehicle 102 can further include internal computing system 124 that can interact with sensor systems 108 as well as the mechanical systems (e.g., vehicle propulsion system 114, braking system 116, steering system 118, cabin system 120 and safety system 122). Internal computing system 124 includes at least one processor and at least one memory system that can store executable instructions to be executed by the processor. Internal computing system 124 can include any number of computing subsystems that can function to control autonomous vehicle 102. Internal computing system 124 can receive inputs from passengers and/or human drivers within autonomous vehicle 102.

Internal computing system 124 can include control service 126, which functions to control operation of autonomous vehicle 102 via, for example, the mechanical systems as well as interacting with sensor systems 108. Control service 126 can interact with other systems (e.g., constraint service 128, communication service 130, latency service 132 and internal computing system 124) to control operation of autonomous vehicle 102.

Internal computing system 124 can also include constraint service 128, which functions to control operation of autonomous vehicle 102 through application of rule-based restrictions or other constraints on operation of autonomous vehicle 102. Constraint service 128 can interact with other systems (e.g., control service 126, communication service 130, latency service 132, user interface service 134) to control operation of autonomous vehicle 102.

Internal computing system 124 can further include communication service 130, which functions to control transmission of signals from, and receipt of signals by, autonomous vehicle 102. Communication service 130 can interact with safety system 122 to provide the waveform sensing, amplification and repeating functionality described herein. Communication service 130 can interact with other systems (e.g., control service 126, constraint service 128, latency service 132 and user interface service 134) to control operation of autonomous vehicle 102.

Internal computing system 124 can also include latency service 132, which functions to provide and/or utilize timestamp information on communications to help manage and coordinate time-sensitive operations within internal computing system 124 and autonomous vehicle 102. Thus, latency service 132 can interact with other systems (e.g., control service 126, constraint service 128, communication service 130, user interface service 134) to control operation of autonomous vehicle 102.

Internal computing system 124 can further include user interface service 134, which functions to provide information to, and receive inputs from, human passengers within autonomous vehicle 102. This can include, for example, receiving a desired destination for one or more passengers and providing status and timing information with respect to arrival at the desired destination. User interface service 134 can interact with other systems (e.g., control service 126, constraint service 128, communication service 130, latency service 132) to control operation of autonomous vehicle 102.

Internal computing system 124 can function to send and receive signals from autonomous vehicle 102 regarding reporting data for training and evaluating machine learning algorithms, requesting assistance from a remote computing system or a human operator, software updates, rideshare information (e.g., pickup and/or dropoff requests and/or locations), etc.

Figure 2:
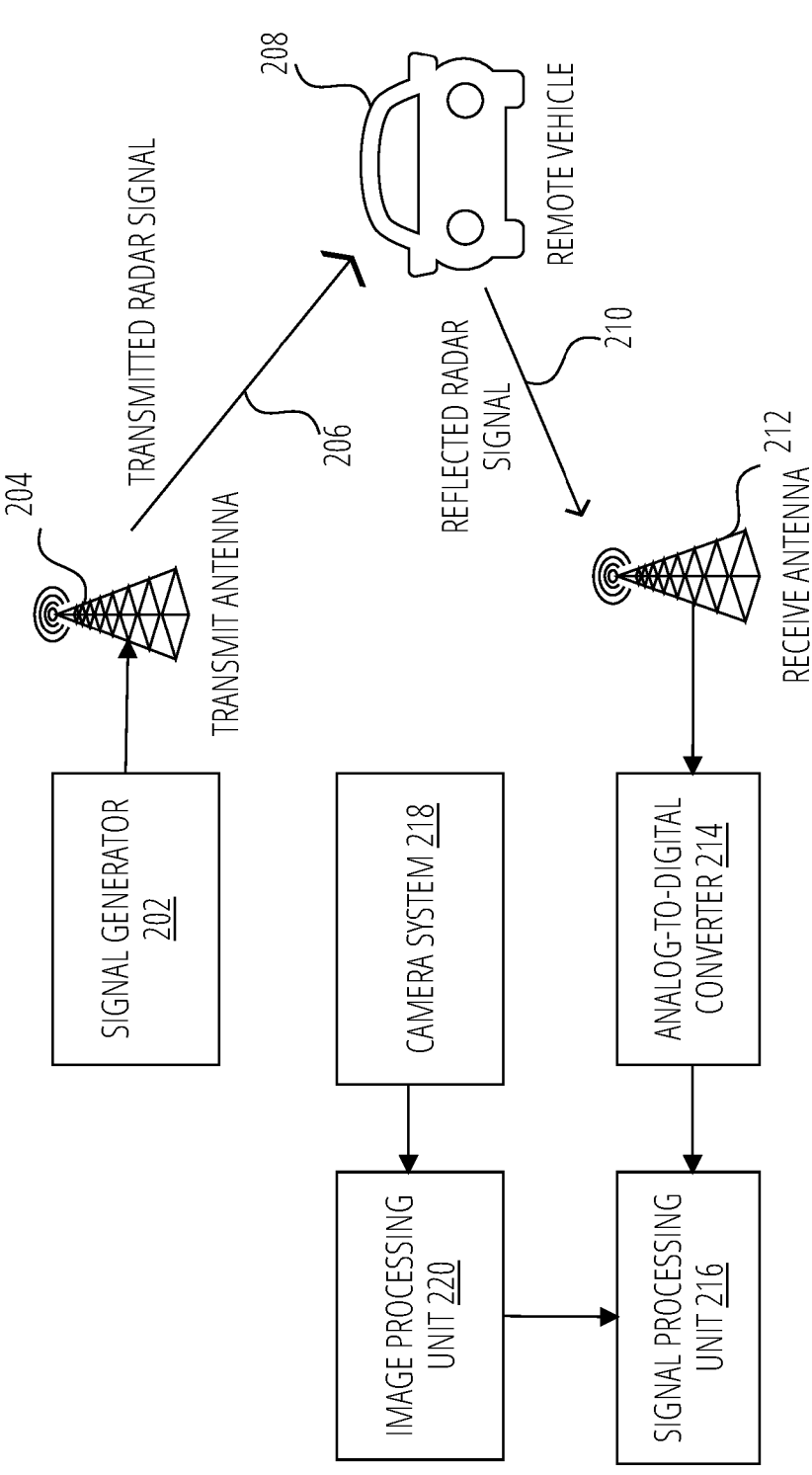
FIG. 2 a block diagram of an example automotive radar system illustrating transmit and receive capability.

FIG. 2 a block diagram of an example automotive radar system illustrating transmit and receive capability. The radar system of FIG. 2 and camera system 218 can be, for example, part of sensor systems 108 in autonomous vehicle 102. In other examples, the automotive radar system of FIG. 2 and camera system 218 can be part of a human-operated vehicle having an advanced driver assistance system (ADAS) that can utilize various sensors including radar sensors and camera system 218.

Signal generator 202 can be, for example, a frequency-modulated continuous wave (FMCW) generator that produces a series of chirps, which are sinusoid signals have frequencies that sweep from a pre-selected minimum frequency to a pre-selected maximum frequency to be transmitted from, for example, a host platform (e.g., autonomous vehicle 102, human-operated ADAS vehicle, automated delivery vehicle). Other signal types (e.g., non-FMCW) can also be supported.

The signal generated by signal generator 202 provides a radar frequency signal to be transmitted by transmit antenna 204 as transmitted radar signal 206. Transmitted radar signal 206 can be reflected by a remote object, for example, remote vehicle 208. Reflected radar signal 210 is detected by receive antenna 212. The received reflected radar signal 210 from receive antenna 212 can be digitized by analog-todigital converter 214 to generate digital RADAR waveforms that are transmitted to signal processing unit 216.

The host platform also includes camera system 218, which can include any number of physical cameras to capture visual images and/or infrared data. Camera system 218 can capture one or more images of remote vehicle 208. Camera system 218 provides captured the visual and infrared data to image processing unit 220. As described in greater detail below, signal processing unit 216 can operate on information from image processing unit 220 and digital RADAR waveforms from analog-to-digital converter 214 to provide a more efficient beamforming process that would otherwise be possible.

Figure 3:
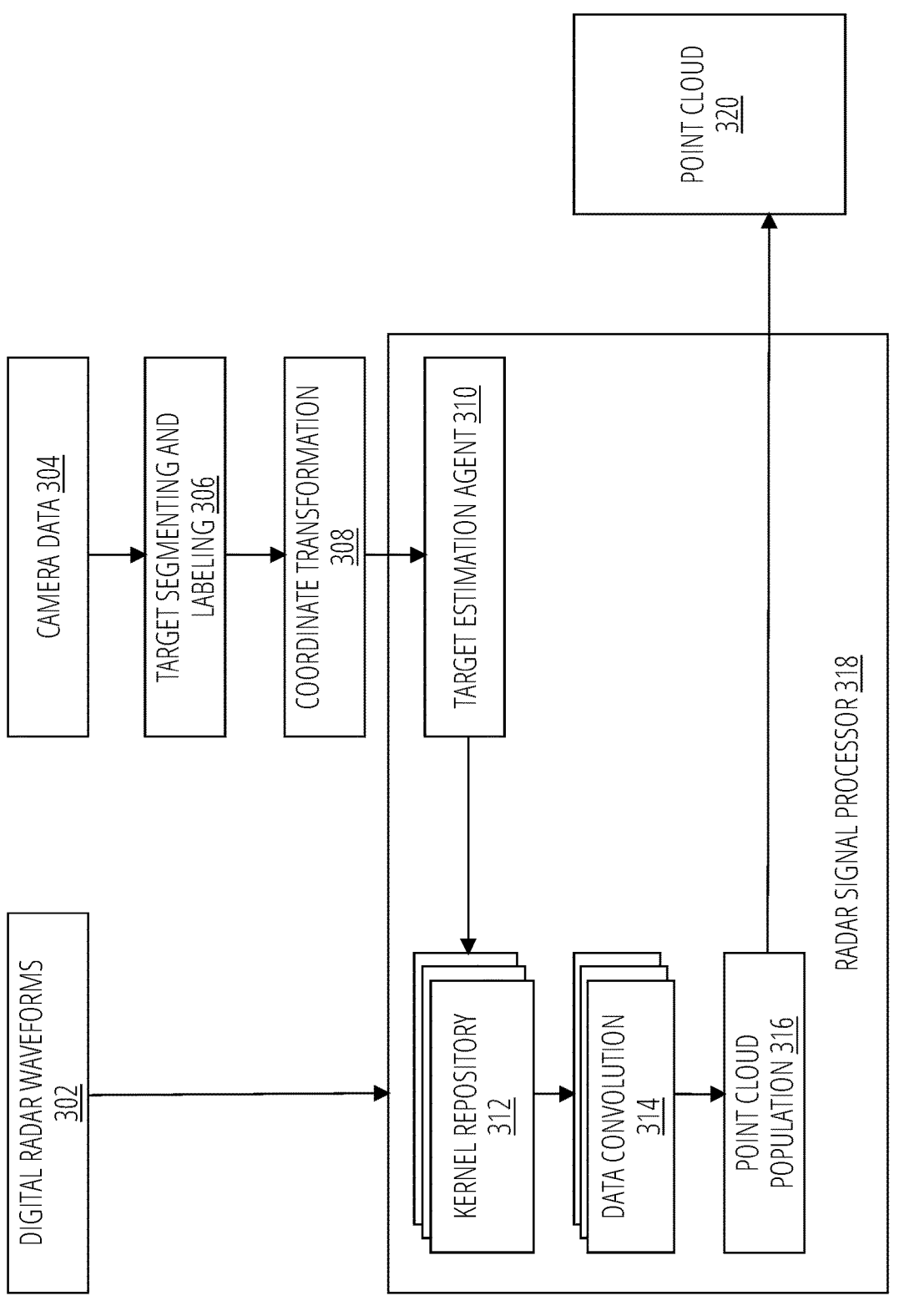
FIG. 3 is a block diagram of an example architecture that can utilize camera information for RADAR beamforming.

FIG. 3 is a block diagram of an example architecture that can utilize camera information for RADAR beamforming. The example architecture of FIG. 3 can be part of autonomous vehicle control systems 106 within autonomous vehicle 102, as illustrated in FIG. 1. In other examples, the architecture of FIG. 3 can be part of a human-operated vehicle having an ADAS that can utilize various sensors including camera systems and radar sensors.

The example architecture of FIG. 3 includes a processing chain that takes advantage of the ability to segment and/or identify targets on a visible or infrared camera image cloud. The camera can be co-registered with the RADAR sensor system field of view (FoV). The camera data can provide initial information that can be used to, for example, select the best available kernel for signal processing. In some examples, a kernel can be selected for each identified object in the FoV. In other examples, a kernel can be selected for each image segment.

RADAR signal processor 318 can receive digital RADAR waveforms 302 (e.g., analogous to digital RADAR waveforms from analog-to-digital converter 214 to signal processing unit 216 in FIG. 2). RADAR signal processor 318 can also receive supplemental camera data to be used as described below. In an example, camera data 304 includes image data and/or infrared data captured by one or more camera systems (e.g., camera system 218) having an overlapping FoV with the automotive RADAR system providing digital RADAR waveforms 302.

Prior to being provided to RADAR signal processor 318, camera data 304 can be processed by one or more image processing units (e.g., image processing unit 220). The camera data 304 processing can include target segmenting and labeling 306 in which one or more targets are identified within camera data 304 and target labels can be assigned to the one or more targets. The targets can include, for example, autonomous vehicles, human-operated vehicles, pedestrians, pets, bicycles, motorcycles, delivery vehicles, mass transit vehicles, etc. As described in greater detail below, information corresponding to the identified targets can be used to select a kernel to be utilized in RADAR signal processing with respect to the target.

In an example, target segmenting and labeling 306 involves identifying target objects captured in camera data 304. Various object recognition techniques can be used to identify target objects within camera data 304. In an example, each identified target object can have an associated target label. In some examples, camera data 304 can be segmented based on the identified target objects and/or target labels so that, for example, one target object exists within each segment. Other segmenting configurations can also be supported.

Coordinate transformation 308 can be performed to translate camera data 304 (or a subset of camera data 304) from the camera frame of reference to the RADAR frame of reference. The one or more target labels, target object data transformed to the RADAR frame of reference is provided to RADAR signal processor 318.

Target estimation agent 310 can receive the target location and type information (e.g., target label and related data) and can use a machine learned model to generate a RADAR cross section estimate for the identified targets. RADAR signal processor 318 can use the information from target estimation agent 310 to select a kernel from kernel repository 312. In an example, a kernel is selected for each target object identified. In another example, a kernel can be selected for an image segment and/or for a group of target objects.

Selection of a kernel from kernel repository 312 can allow for the selection of suitable kernels for high contrast scenarios (e.g., a cyclist next to a bus, a pedestrian next to a delivery van). In an example, the best available kernel for each target object is selected from kernel repository 312 using location and target type information for each target object. In other configurations, other and/or different sets of information can be utilized to select a kernel from kernel repository 312.

RADAR signal processor 318 can perform data beamforming by performing data convolution 314 with digital RADAR waveforms 302. In an example, this can be performed by a machine learned (ML) process, which can make use of the target object location information to maximize output resolution corresponding to those regions/locations. Point cloud population 316 can be achieved using results from data convolution 314 to provide point cloud 320.

Due to the use of camera-based information, an accurate initial estimate in the main search dimensions (e.g., azimuth, elevation) and the target object type and/or dimensions can be use for data beamforming. In one example, ML beamforming techniques can be utilized. The results of the processing approach as illustrated in FIG. 3 can be more computationally efficient and result in a better use of platform hardware.

Further, the possible low-level data fusion (e.g., camera data 304 with digital RADAR waveforms 302) to select a kernel can allow for use of all of the full RADAR waveform signal features. For example, by providing prior knowledge to the ML process, the phase and magnitude of the RADAR waveforms can be used to maximize the angular resolution of the sensor. By using this information in conjunction with optimized kernels, the approach of FIG. 3 can potentially provide improved performance in high contrast scenarios (e.g., semi-truck next to pedestrian).

Conceptually, the approach described utilizes a higher quality hypothesis as compared to previous techniques, which can lead to generation of very high resolution point clouds. Due to the nature of the full waveform RADAR signal, conventional ML beamformers use generic hypotheses as their starting point, which may lead to the formation of suboptimal point clouds in order to comply with required sensor frame rates. by using camera-based information, to find a customized/optimized kernel, the approach described herein can potentially achieve a higher level of refinement leading to the formation of higher resolution RADAR point clouds as compared to previous ML techniques.

FIG. 4 is a flow diagram for one technique for utilizing camera information for RADAR beamforming. The functionality of FIG. 4 can be provided by, for example, autonomous vehicle control systems 106 within autonomous vehicle 102, as illustrated in FIG. 1. In other examples, the functionality of FIG. 4 can be provided by systems within a human-operated vehicle having an ADAS that can utilize various sensors including camera systems and radar sensors.

The technique of FIG. 4 is one example technique based on the example of FIG. 3. While various example operations are illustrated as sequential in FIG. 4, alternate orderings and/or parallel operation can also be supported. For example, coordinate transformation (406) does not necessarily occur after digital RADAR waveforms are received (404) by a particular component of the architecture.

Camera information (e.g., camera data 304) can be received from one or more camera systems (e.g., camera system 218) for a scene captured by the cameras of the one or more camera systems, 402. The camera information can include, for example, image data, infrared data, metadata associated with the image capture, etc. In an example, the camera information can include target object information including, for example, target labels for each target object. The camera information can also be segmented into smaller scenes or blocks. In some example, a pre-processing operation can be performed in which a scene is scanned and cropped to eliminate areas with no potential target objects.

Digital RADAR waveforms (e.g., digital RADAR waveforms 302) can be received, 404. The digital RADAR waveforms can be digitized versions of received reflected RADAR signals (e.g., received reflected radar signal 210). The frame of reference for the RADAR sensor systems receiving the reflected RADAR signals can overlap (partially or fully) with at least one of the cameras.

Camera target object locations and/or other camera information coordinates are transformed from the camera system frame of reference to the RADAR system frame of reference, 406. After the coordinate transformation (e.g., coordinate transformation 308), the target labels, location information and/or additional information is sent to the RADAR signal processor (e.g., RADAR signal processor 318).

The RADAR signal processor (and/or other system components) can determine a RADAR cross section estimate for the identified target objects using, for example, the transformed coordinates, 408. The RADAR cross section (RCS) the target object's ability to reflect RADAR signals in the direction of the RADAR receiver (e.g., receive antenna 212). In general, the RCS of a target object is dependent upon the ratio of the structural dimensions of the target object and the wavelength of the RADAR signal. Various techniques are known for determining RCS. In some examples, the technique used to determine the RCS of a target object can be selected based on camera information corresponding to the target object.

A kernel is selected (e.g., from kernel repository 312) based on camera information, RCS and/or other information determined for the respective target objects, 410. Selection of a kernel can allow for custom kernel utilization which can provide improved performance in, for example, high contrast scenarios (e.g., a cyclist next to a tanker truck, a pedestrian next to a utility trailer). In an example, the best available kernel for each target object is selected using location and target type information from the camera information for each target object. The RCS estimate can also be used to select a kernel. In other configurations, other and/or different sets of information can be utilized to select a kernel.

RADAR signal processing can be performed using the selected kernel, 412. In an example, the RADAR signal processing can include data beamforming by convolving digital RADAR waveforms with selected kernels. In an example, each target object identified using camera data can be processed using a kernel selected for that target object based on characteristics of the target object. In other examples, multiple target objects can be processed using a kernel selected for the set of target objects. Some or all of the RADAR signal processing can be provided by a machine learned (ML) process that can make use of the target object location information to maximize output resolution corresponding to those regions/locations.

A point cloud can be populated based on results from the RADAR signal processing using the selected kernel, 414. The resulting point cloud can then be used by control systems within a host platform (e.g., autonomous vehicle 102) to control operation of the host platform.

FIG. 5 is a block diagram of one example of a processing system that can utilize camera information for RADAR beamforming. In one example, system 514 can be part of an autonomous vehicle (e.g., autonomous vehicle 102 as part of internal computing system 124) that utilizes various sensors including radar sensors. In other examples, system 514 can be part of a human-operated vehicle having an ADAS that can utilize various sensors including radar sensors.

In an example, system 514 can include processor(s) 516 and non-transitory computer readable storage medium 518. Non-transitory computer readable storage medium 518 may store instructions 502, 504, 506, 508, 510 and 512 that, when executed by processor(s) 516, cause processor(s) 516 to perform various functions. Examples of processor(s) 516 may include a microcontroller, a microprocessor, a central processing unit (CPU), a graphics processing unit (GPU), a data processing unit (DPU), an application-specific integrated circuit (ASIC), an field programmable gate array (FPGA), a system on a chip (SoC), etc. Examples of a non-transitory computer readable storage medium 518 include tangible media such as random access memory (RAM), read-only memory (ROM), electrically erasable programmable read-only memory (EEPROM), flash memory, a hard disk drive, etc.

Instructions 502 cause processor(s) 516 to receive camera information (e.g., camera data 304) from one or more camera systems (e.g., camera system 218) for a scene captured by the cameras of the one or more camera systems. The camera information can include, for example, image data, infrared data, metadata associated with the image capture, etc. In an example, the camera information can include target object information including, for example, target labels for each target object. The camera information can also be segmented into smaller scenes or blocks. In some example, a pre-processing operation can be performed in which a scene is scanned and cropped to eliminate areas with no potential target objects.

Instructions 504 cause processor(s) 516 to receive digital RADAR waveforms (e.g., digital RADAR waveforms 302) can be received from one or more RADAR sensor systems (e.g., as illustrated in FIG. 2). The digital RADAR waveforms can be digitized versions of received reflected RADAR signals (e.g., received reflected radar signal 210). The frame of reference for the RADAR sensor systems receiving the reflected RADAR signals can overlap (partially or fully) with at least one of the cameras.

Instructions 506 cause processor(s) 516 to transform coordinates for camera target object locations from the camera system frame of reference to the RADAR system frame of reference. After the coordinate transformation (e.g., coordinate transformation 308), the target labels, location information and/or additional information is sent to the RADAR signal processor (e.g., RADAR signal processor 318).

Instructions 508 cause processor(s) 516 to cause the RADAR signal processor (and/or other system components) to determine a RADAR cross section estimate for the identified target objects using, for example, the transformed coordinates. Various techniques can be used for determining RCS. In some examples, the technique used to determine the RCS of a target object can be selected based on camera information corresponding to the target object.

Instructions 510 cause processor(s) 516 to select a kernel from a set of available kernels (e.g., from kernel repository 312) based on camera information, RCS and/or other information determined for the respective target objects. In an example, the best available kernel for each target object is selected using location and target type information from the camera information for each target object. The RCS estimate can also be used to select a kernel. In other configurations, other and/or different sets of information can be utilized to select a kernel.

Instructions 512 cause processor(s) 516 to populate a point cloud based on results from the RADAR signal processing using the selected kernel. The resulting point cloud can then be used by control systems within a host platform (e.g., autonomous vehicle 102) to control operation of the host platform.

In the description above, for the purposes of explanation, numerous specific details are set forth in order to provide a thorough understanding of the described examples. It will be apparent, however, to one skilled in the art that examples may be practiced without some of these specific details. In other instances, well-known structures and devices are shown in block diagram form. There may be intermediate structures between illustrated components. The components described or illustrated herein may have additional inputs or outputs that are not illustrated or described.

Various examples may include various processes. These processes may be performed by hardware components or may be embodied in computer program or machine-executable instructions, which may be used to cause processor or logic circuits programmed with the instructions to perform the processes. Alternatively, the processes may be performed by a combination of hardware and software.

Portions of various examples may be provided as a computer program product, which may include a non-transitory computer-readable medium having stored thereon computer program instructions, which may be used to program a computer (or other electronic devices) for execution by one or more processors to perform a process according to certain examples. The computer-readable medium may include, but is not limited to, magnetic disks, optical disks, read-only memory (ROM), random access memory (RAM), erasable programmable read-only memory (EPROM), electrically-erasable programmable read-only memory (EE-PROM), magnetic or optical cards, flash memory, or other type of computer-readable medium suitable for storing electronic instructions. Moreover, examples may also be downloaded as a computer program product, wherein the program may be transferred from a remote computer to a requesting computer. In some examples, non-transitory computer readable storage medium 518 has stored thereon data representing sequences of instructions that, when executed by a processor(s) 516, cause the processor(s) 516 to perform certain operations.

Reference in the specification to "an example," "one example," "some examples," or "other examples" means that a particular feature, structure, or characteristic described in connection with the examples is included in at least some examples, but not necessarily all examples. Additionally, such feature, structure, or characteristics described in connection with "an example," "one example," "some examples," or "other examples" should not be construed to be limited or restricted to those example(s), but may be, for example, combined with other examples. The various appearances of "an example," "one example," or "some examples" are not necessarily all referring to the same examples.

What is claimed is:

1. An autonomous vehicle comprising one or more sensor systems to detect characteristics of an operating environment, the one or more sensor systems comprising at least a camera sensor system and a RADAR sensor system, the one or more sensor systems to:

receive, from the camera sensor system, camera information co-registered with a RADAR sensor system field of view of a scene having a target object;

segment the camera information into an image segment that includes the target object;

identify the target object from the camera information;

determine a target type and target location coordinates for the target object based on the image segment;

receive, from the RADAR sensor system, digital RADAR waveforms corresponding to a frame of reference of the RADAR, the frame of reference including the target object;

transform the target location coordinates for the target object to the frame of reference;

determine a radar cross section estimation for the target object based on a ratio of a structural dimension of the image segment to a wavelength of the RADAR system, wherein the structural dimension is based on the transformed coordinates;

select a kernel from a kernel repository based on the radar cross section estimation, target location coordinates, and the target type, wherein the selected kernel comprises a time series representation of the target type applicable to the scene;

perform data beamforming by convolving the digital RADAR waveforms utilizing the selected kernel to maximize output resolution corresponding to the camera coordinates and maximize the angular resolution based on the phase and magnitude of the RADAR waveforms; and populate a point cloud with results from the RADAR signal processing.

2. The autonomous vehicle of claim 1, wherein the camera information for the scene comprises location information for at least one target and size information for the target object.

3. The autonomous vehicle of claim 1, wherein the camera information comprises azimuth and elevation information.

4. The autonomous vehicle of claim 1, wherein the RADAR signal processing comprises at least performing a convolution utilizing digital RADAR waveforms and the selected kernel.

5. The autonomous vehicle of claim 1, wherein the scene has multiple target objects, further comprising selecting a kernel for each of the multiple target objects.

6. The autonomous vehicle of claim 1, wherein the one or more sensor systems are further configured to populate a point cloud with results from the RADAR signal processing.

7. A non-transitory computer-readable medium having stored thereon instructions that, when executed by one or more processors, are configurable to cause the processors to:

receive camera information for a scene having a target object, wherein the camera information is co-registered with a RADAR sensor system field of view of the scene;

segment the camera information into an image segment that includes the target object;

identify the target object in the image segment from the camera information;

determine a target type and target location coordinates for the target object based on the image segment;

receive digital RADAR waveforms corresponding to a frame of reference of a RADAR system, the frame of reference including the target object;

transform the target location coordinates for the target object to the frame of reference;

determine a radar cross section estimation for the target object based on a ratio of a structural dimension of the image segment to a wavelength of the RADAR system, wherein the structural dimension is based on the transformed coordinates;

select a kernel from a kernel repository based on the radar cross section estimation, target location coordinates, and the target type, wherein the selected kernel comprises a time series representation of the target type applicable to the scene;

perform data beamforming by convolving the digital RADAR waveforms with the selected kernel to maximize output resolution corresponding to the target location coordinates and the angular resolution based on the phase and magnitude of the RADAR waveforms; and populate a point cloud with results from the RADAR signal processing.

8. The non-transitory computer-readable medium of claim 7, wherein the camera information for the scene comprises location information for at least one target and size information for the target object.

9. The non-transitory computer-readable medium of claim 7, wherein the camera information comprises azimuth and elevation information.

10. The non-transitory computer-readable medium of claim 7, wherein the RADAR signal processing comprises at least performing a convolution utilizing digital RADAR waveforms and the selected kernel.

11. The non-transitory computer-readable medium of claim 7, wherein the scene has multiple target objects and the processor is further configured to select a kernel for each of the multiple target objects.

12. The non-transitory computer-readable medium of claim 7, wherein the target object comprises one of: a vehicle, a bicycle, and a pedestrian.

13. A system comprising:

a memory system; and one or more hardware processors coupled with the memory system, the one or more processors to:

receive camera information for a scene having a target object, wherein the camera information is co-registered with a RADAR sensor system field of view of the scene;

segment the camera information into an image segment that includes the target object;

identify the target object in the image segment from the camera information;

determine a target type and target location coordinates for the target object based on the image segment;

receive digital RADAR waveforms corresponding to a frame of reference of a RADAR system, the frame of reference including the target object;

transform the target location coordinates for the target object to the frame of reference;

determine a radar cross section estimation for the target object based on a ratio of a structural dimension of the image segment to a wavelength of the RADAR system, wherein the structural dimension is based on the transformed coordinates;

select a kernel from a kernel repository based on the radar cross section estimation, target location coordinates, and the target type, wherein the selected kernel comprises a time series representation of the target type applicable to the scene; and perform data beamforming by convolving the digital RADAR waveforms with the selected kernel to maximize output resolution corresponding to the target location coordinates and the angular resolution based on the phase and magnitude of the RADAR waveforms.

14. The system of claim 13, wherein the camera information for the scene comprises location information for at least one target and size information for the target object.

15. The system of claim 13, wherein the camera information comprises azimuth and elevation information.

16. The system of claim 13, wherein the RADAR signal processing comprises at least performing a convolution utilizing digital RADAR waveforms and the selected kernel.

17. The system of claim 13, wherein the one or more hardware processors are further configured to populate a point cloud with results from the RADAR signal processing.

* * * * *